United States Patent [19]

Bigolin

[11] Patent Number: 4,945,787
[45] Date of Patent: Aug. 7, 1990

[54] ADJUSTABLE BICYCLE SHOE CLIP INCLUDING A TOOTHED BELT FOR LOCKING BOTH SIDES OF A CYCLIST FOOT

[76] Inventor: Giuseppe Bigolin, Via Fermi, 2/A, 31010 Casella d'Asolo (Treviso), Italy

[21] Appl. No.: 365,963

[22] Filed: Jun. 14, 1989

[30] Foreign Application Priority Data

Jun. 14, 1988 [IT] Italy .................... 21429[U]

[51] Int. Cl.⁵ ............................................. G05G 1/14
[52] U.S. Cl. ..................................... 74/534.6; 36/131
[58] Field of Search ............... 36/131, 132; 74/594.6, 74/594.4; 280/11.33, 11.19, 11.27, 11.30, 11.31; 24/170, 581

[56] References Cited

U.S. PATENT DOCUMENTS

| | | | |
|---|---|---|---|
| 859,684 | 7/1907 | McMonies | 74/594.6 |
| 4,361,972 | 12/1982 | Miller | 36/131 |
| 4,638,685 | 1/1987 | Cigolini | 74/594.6 |
| 4,682,514 | 7/1987 | Jona | 74/594.6 |
| 4,767,127 | 8/1988 | Olivieri | 280/11.33 |
| 4,773,886 | 9/1988 | Teeter et al. | 280/11.3 X |
| 4,787,266 | 11/1988 | Romano | 24/170 X |

FOREIGN PATENT DOCUMENTS

| | | | |
|---|---|---|---|
| 2510967 | 2/1983 | France | 36/131 |
| 457668 | 12/1936 | United Kingdom | 74/594.6 |
| 703040 | 1/1954 | United Kingdom | 74/594.6 |

Primary Examiner—Vinh T. Luong
Attorney, Agent, or Firm—Bucknam and Archer

[57] ABSTRACT

An adjustable bicycle shoe clip comprises a small frame to be fixed to a bicycle medal and bearing a rectangular shape structure having an encompassing front portion and provided, at the rear, with a holding fork for holding a belt including a portion having teeth and provided for engaging with an edge of a lever coupled to said rectangular shape structure.

1 Claim, 1 Drawing Sheet

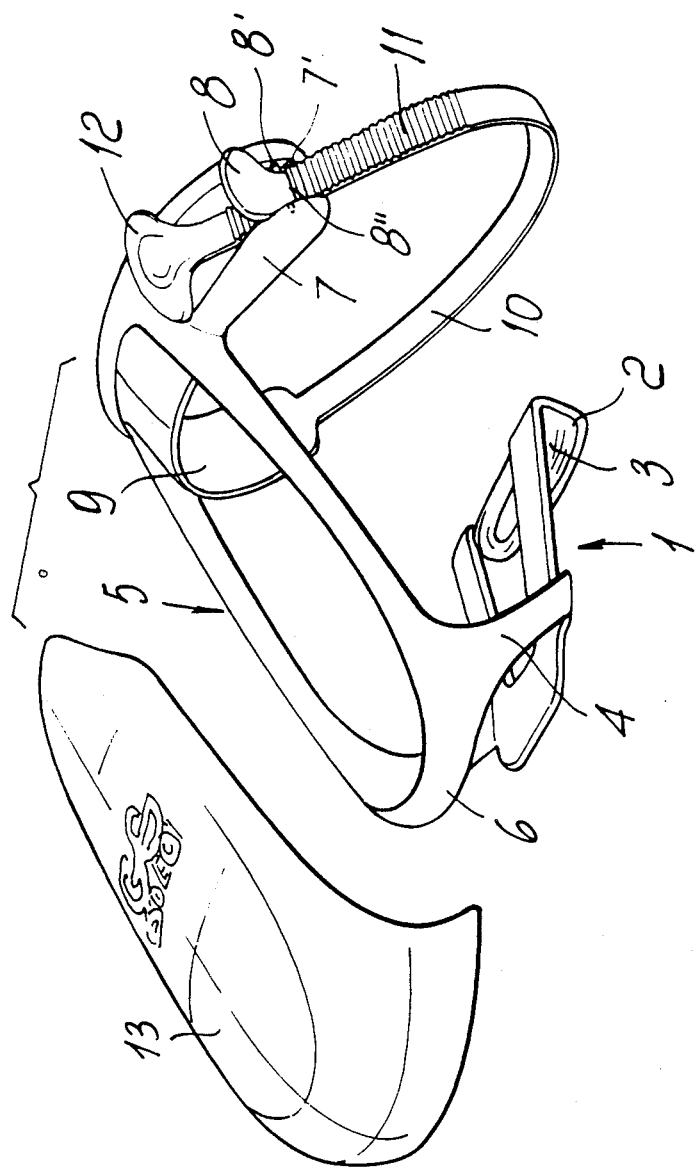

ADJUSTABLE BICYCLE SHOE CLIP INCLUDING A TOOTHED BELT FOR LOCKING BOTH SIDES OF A CYCLIST FOOT

BACKGROUND OF THE INVENTION

The present invention relates to a bicycle shoe clip, provided with an adjustable toothed belt, for locking both sides of a cyclist foot.

As is known, race bicycles comprise, on the front of each pedal, a suitable bracket structure, thereinto the foot toe is inserted in order to prevent the cyclist foot from disengaging from the pedal.

SUMMARY OF THE INVENTION

The main object of the present invention is to provide such a bicycle shoe clip which imparts a locking force on both sides of a cyclist foot.

Another object of the present invention is to provides such a bicycle shoe clip which can be locked on the shoe and removed therefrom by simple and quick operations.

Yet another object of the invention is to provide such a bicycle shoe clip which can be fitted to all sizes of pedals.

According to one aspect of the present invention, the above mentioned objects, as well as yet other objects, which will become more apparent hereinafter, are achieved by a bicycle shoe clip characterized in that said clip essentially comprises a small frame to be fixed to a bicycle pedal and bearing a rectangular shape structure having an encompassing front portion and provided, at the rear, with holding means for holding a belt including a portion having teeth for engaging with an edge of a lever coupled to said rectangular shape structure.

BRIEF DESCRIPTION OF THE DRAWINGS

Further characteristics and advantages of the bicycle shoe clip according to the present invention will become more apparent from the following detailed description of a preferred embodiment thereof, which is illustrated, by way of an indicative but not limitative example, in the accompanying drawing where:

FIG. 1 is a schematic perspective view illustrating the bicycle clip according to the invention and further showing, in a disassembled condition, a shoe-cover which can be coupled to the subject clip.

DESCRIPTION OF THE PREFERRED EMBODIMENT

With reference to the figure of the drawing, the bicycle shoe clip according to the invention comprises a small frame, indicated overally at the reference number 1 having a bracket bent end 2 including a longitudinal slot 3 provided for removably coupling the clip to one pedal (not shown) of a bicycle, by suitable coupling means.

In this connection, it should be pointed out that the mentioned bent end is specifically designed for provided an adjustable coupling with the pedal, so as to fit the clip frame to pedals having any desired size.

Advantageously, moreover, the mentioned small frame comprises two slidingly coupled portions which are slidingly interconnected so as to vary said small frame size.

From the front portion of the small frame there extends upwardly, by two tapering lugs 4, a substantially rectangular shape structure 5 including a front band 6 defining an anatomic type of ferrule member.

At the opposite end of said structure, there is provided a small side fork member 7 including, at its end portion, a small cross-member 7', above which there is pivoted at 8' a lever 8.

At the same end of said structure, there is applied a stuffed collar 9 extending with a small belt 10 including a toothed portion 11 and ending with a gripping or handle member 12 also of anatomic configuration.

This small belt engages, by its toothed portion, between said cross-member and lever so as to be engaged, during a pulling operation, by the lower edge of 8" said lever.

In operation, as said handle is subjected to a pulling action, the belt 10 will be properly clamped on the cyclist shoe, thereby locking the cyclist foot at both sides thereof.

As it should be apparent, by operating the lever 8 in the reverse direction, said lever can be disengaged from said toothed belt so as to unlock the cyclist foot.

A cyclist shoe covering structure 13 is moreover provided, including an encompassing front portion and which can be snap engaged in the disclosed stretcher.

While the invention has been disclosed and illustrated with reference to a preferred embodiment thereof, it should be apparent that the disclosed embodiment is susceptible to several modifications and variations all of which will come within the spirit and scope of the appended claims.

I claim:

1. A bicycle shoe clip comprising a clip frame including two slidingly coupled portions and bearing a substantially rectangular structure having a front foot restraining band and a rear toothed belt holding fork which holds a toothed belt, said toothed belt having an end gripping member, a toothed belt engaging lever pivoted to said toothed belt holding fork, said lever having a bottom edge engaging with said toothed belt for displacing said toothed belt as said lever is operated, said substantially rectangular structure further including a stuffed collar associated with an inner portion of said toothed belt, said holding fork having end portions, a cross member extending between said end portions of said fork member, said toothed belt passing between said bottom edge of said lever and said cross member, wherein said clip further comprises a shoe covering structure having an encompassing front portion and provided for snap engaging in said clip.

* * * * *